Figure 1:
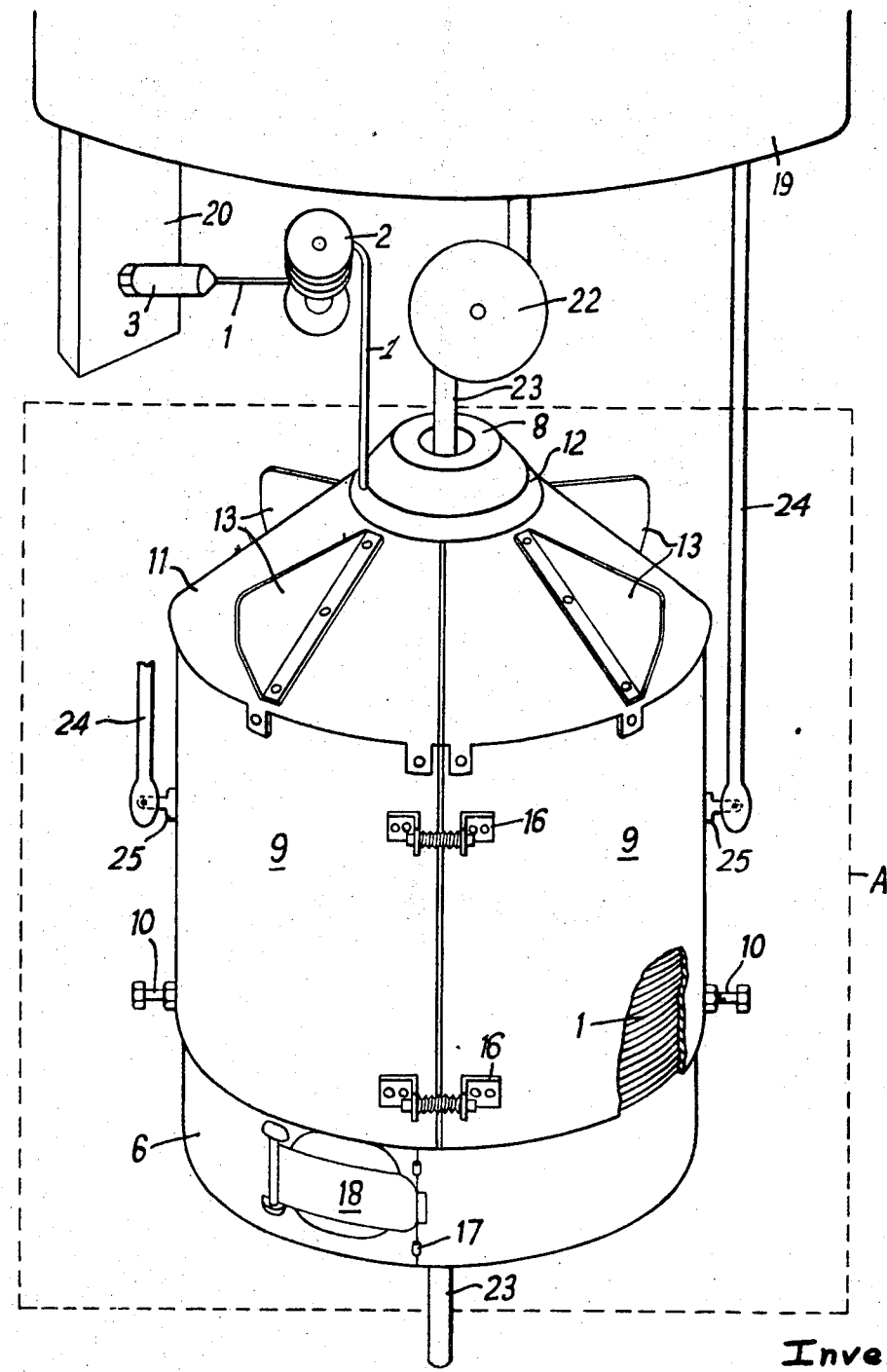

United States Patent
Bell et al.

[15] 3,705,431
[45] Dec. 12, 1972

[54] MOORING DEVICES

[72] Inventors: Samuel Bell; Leslie Gerald Bullen, both of Dartmouth, Nova Scotia, Canada

[73] Assignee: Electric & Musical Industries Limited, Middlesex, England

[22] Filed: May 7, 1970

[21] Appl. No.: 35,544

[30] Foreign Application Priority Data

May 7, 1969 Great Britain..................23,191/69

[52] U.S. Cl. .................................................9/8 R
[51] Int. Cl. .............................................B63b 21/52
[58] Field of Search....9/8 R; 114/206 R, 230; 340/2; 73/170 A

[56] References Cited

UNITED STATES PATENTS 3,377,615  4/1968  Lutes...........................340/2
3,130,703  4/1964  Thompson......................9/8

Primary Examiner—Milton Buchler
Assistant Examiner—Gregory W. O'Connor
Attorney—Fleit, Gipple & Jacobson

[57] ABSTRACT

A mooring device includes a tethering cable for tethering a buoyant object, at least one instrument package assembly attached to the buoyant object and through part of which at least the tethering cable passes, connecting cable connecting the buoyant object and the instrument package assembly and formed into a coiled configuration, and means for releasing the instrument package assembly from the buoyant object so that it can be allowed to fall from the buoyant object under its own weight down the tethering cable to a depth predetermined by the available length of the connecting cable. Preferably the arrangement is such that the connecting cable is wrapped round the tethering cable as the instrument package assembly falls and the connecting cable is electrically conductive.

4 Claims, 2 Drawing Figures

PATENTED DEC 12 1972

3,705,431

SHEET 1 OF 2

MOORING DEVICES

The present invention relates to mooring devices, and is especially applicable to the deployment of an instrument package down a taut mooring cable in the deep sea.

Many oceanographic buoy systems are constructed on a two stage principle, that is, a surface buoy is tethered by a slack upper cable to a submerged float, in turn tethered by a taut lower mooring cable to an anchor on the ocean bed. The purpose of the submerged float, typically implanted at say a depth of 300 feet, is to support the taut lower mooring cable which, typically, could be as much as 18,000 feet in length, and along which are deployed one or more instrument packages. The nature of this type of system dictates that the implantation methods be automatic, and therefore the lower mooring cable is required to be wrapped round a winch drum on the submerged float, which in turn prohibits the introduction of instrument packages in the lower mooring cable.

An object of the present invention is to provide a mooring device, especially applicable to the above mentioned field, whereby the above mentioned disadvantage is substantially overcome.

According to the present invention there is provided a mooring device including a tethering cable for tethering a buoyant object, at least one instrument package deployment assembly attached to said buoyant object and through which said tethering cable passes, connecting cable formed in a coiled configuration connecting said buoyant object to an instrument package contained in said instrument package deployment assembly, means for releasing said instrument package deployment assembly from said buoyant object so that said assembly can fall from said buoyant object along said tethering cable, a sensor included in said assembly for sensing the completion of payout of said connecting cable, and a locking mechanism included in said assembly for locking said assembly to said tethering cable when said sensor provides an indication that payout of said connecting cable is complete.

Preferably said connecting cable is wrapped round said tethering cable as said instrument package assembly falls.

Figure 2:
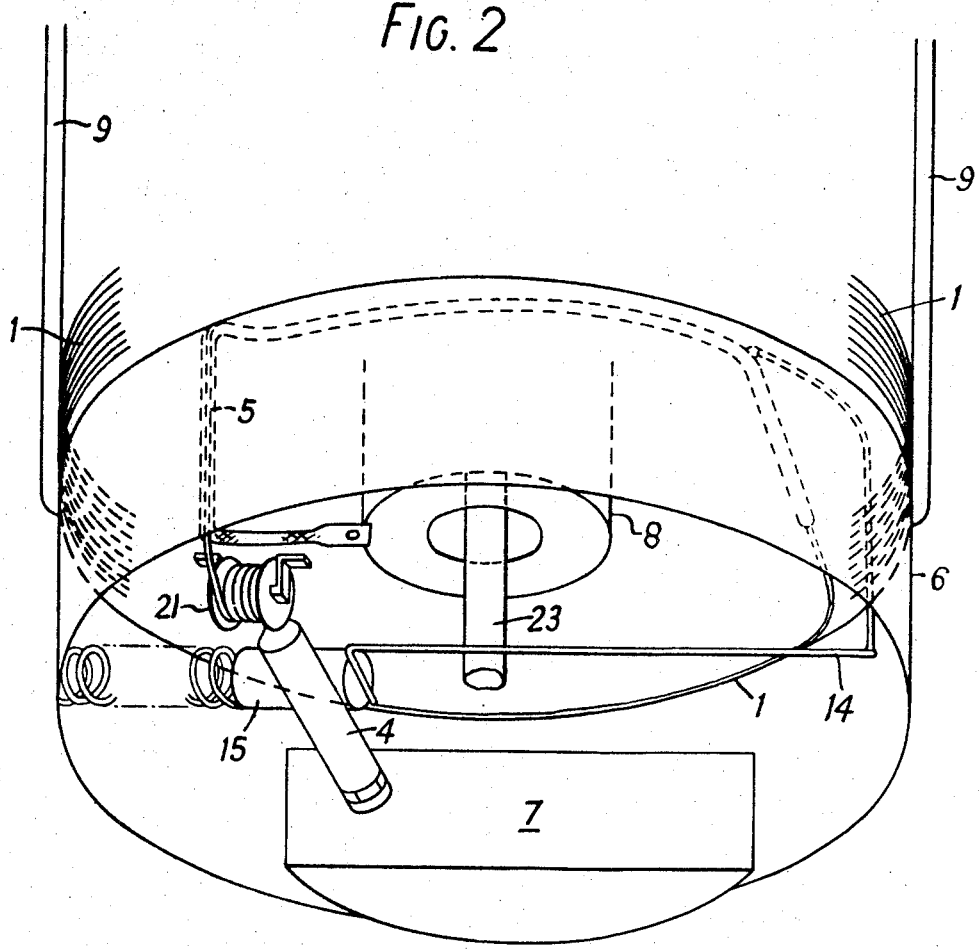

In order that the present invention may be fully understood and readily carried into effect, it will now be described with reference to the accompanying drawings of which:

FIG. 1 shows one example of a mooring device according to the present invention, and FIG. 2 shows another view of part of the device shown in FIG. 1 to further the explanation of its operation.

The example of the present invention to be described is one in which it is required to deploy an instrument package at a selected depth in the ocean below a submerged float, and attached to a taut lower mooring cable connecting the submerged float to an ocean-bed anchor. In addition, in order that data recorded by the instrument package is available at the surface, electrical continuity must be established between it and a surface buoy. In this example of the present invention an instrument package deployment assembly is first attached underneath the submerged float and the instrument package connected to the submerged float by means of a coiled length of cable. To establish electrical continuity between the instrument package and the submerged float, and hence to the surface buoy, the coiled cable is electrically conductive. When the major mooring has been established, and the submerged float has been firmly anchored by the taut lower mooring cable (by means such as are described in U.S. Pat. application Ser. No. 654,892 the instrument package deployment assembly is released from the underside of the submerged float and slides down the lower mooring cable deploying the conductive cable as it falls and finally coming to rest at a depth predetermined by the length of the coiled conductive cable, at which point the instrument package deployment assembly is locked onto the lower mooring cable and instruments deployed automatically in any manner desired.

Reference will now be made to FIGS. 1 and 2, which show an instrument package deployment assembly substantially contained in outline A, and the underside of the assembly respectively.

Referring to FIG. 1 an electrical conductor 1, of selected length, comprising the cable from instrument package 7 to submerged float 19, is wound in the form of a hollow cylinder, or coil, and each winding is encased in a silastic rubber or similar compound. The upper end of electrical conductor 1 is terminated by a strain relief device 2, and also an underwater plug 3 connecting with an underwater electrical socket 20 located on a submerged float 19. Referring now to FIG. 2 the lower end of electrical conductor 1 is terminated with an underwater connector 4 which locates on a socket in an instrument package 7. The lower end of electrical conductor 1 is also fitted with two strain relief devices 21 and 5, one of which, 21, is similar to that on the upper end of electrical conductor 1.

The conductor assembly locates on a circular platform 6 which also carries the instrument package 7, and a center tube 8 in the form of a hollow cylinder extending up through the center of the conductor assembly. A casing 9 in the form of a thin split cylinder is attached to the rim of the platform 6 using locking bolts 10, (referring now to FIG. 1) and encloses the conductor assembly. A frusto-conical enclosure 11 at the top of the split cylindrical casing 9 is designed to provide an annular space between its top and the center tube 8 attached to the circular base 6. Fitted in this space is a rubber tensioning grommet 12. Fins 13 are attached to the outside of the frusto-conical enclosure 11 to ensure a uniform and predictable descent of the whole assembly. The whole instrument package deployment assembly is located centrally below a winch drum 22 carrying the lower mooring cable 23 and is attached to the underside of submerged float 19 by means of connecting rods 24 which are connected from float 19 to lugs 25 on casing 9. The attachment to lugs 25 is achieved by means of a plug of material soluble in sea water and is such that the material will only completely dissolve and break the attachment until after lower mooring cable 23 is fully paid out and is taut. Prior to instrument package deployment, then, the lower mooring cable 23 pays out through the center tube 8.

After an anchor has reached the sea bed, and all the required mooring cable has been paid out and is taut, the attachment of connecting rods 24 to lugs 25 is broken and the instrument package assembly is released from the underside of submerged float 19 and falls under its own weight down the lower mooring cable 23. It may alternatively be arranged that means sensitive to pay out of mooring cable 23 are provided which sense when cable pay out ceases and cause a connection between float 19 and the instrument package assembly to be broken, so that the instrument package assembly is released immediately after tethering of float 19 has been achieved. As it falls the electrical conductor 1 pays out from the encapsulated coil within the assembly. The rubber tensioning grommet 12 is so arranged that a force of two or three pounds is necessary to pay out the electrical conductor 1, and thus as the whole assembly falls the electrical conductor 1 is firmly wrapped round the lower mooring cable 23.

When the whole instrument deployment assembly reaches the depth determined by the length of the electrical conductor 1, the action of paying out the last turn of the conductor 1 triggers a lever mechanism 14 which in turn activates a spring loaded piston 15 (see FIG. 2) which locks the circular platform 6 to the mooring cable 23.

A timed release mechanism 16 operates approximately three hours, after operation of the locking, releasing the split cylindrical casing 9 into the sea. A further release mechanism 17 timed to operate approximately one hour after the release of split cylindrical casing 9 then frees a gate 18 which allows for the deployment of the instruments from the instrument package 7 as required. Timed released mechanisms 16 and 17 comprise soluble material type timed release mechanisms, that is the attachments are achieved by means of plugs of material soluble in sea water. Typically, instruments such as hydrophones or temperature probes are deployed on self-erecting booms radially to the lower mooring cable 23.

The present invention is not limited to the deployment of a single assembly, indeed several instrument packages may each be deployed to their own predetermined depths from the one submerged float by means of several instrument package deployment assemblies in tandem, each one being deployed to a predetermined depth below the one above it.

What we claim is:

1. A mooring device including a tethering cable for tethering a buoyant object, at least one instrument package deployment assembly attached to said buoyant object and through which said tethering cable passes, connecting cable formed in a coiled configuration connecting said buoyant object to an instrument package contained in said instrument package deployment assembly means for releasing said instrument package deployment assembly from said buoyant object so that said assembly can fall from said buoyant object along said tethering cable, a sensor included in said assembly for sensing the completion of payout of said connecting cable, and a locking mechanism included in said assembly for locking said assembly to said tethering cable when said sensor provides an indication that payout of said connecting cable is complete.

2. A mooring device according to claim 1 in which said connecting cable coils round said tethering cable as said instrument package falls.

3. A mooring device according to claim 1 in which said connecting cable includes at least one electrically conductive core.

4. A mooring device according to claim 1 including a plurality of instrument package deployment assemblies threaded on said tethering cable and connected to said buoyant object by respective connecting cables.

* * * * *